United States Patent
Saito

(10) Patent No.: US 8,525,656 B2
(45) Date of Patent: Sep. 3, 2013

(54) DRIVING CONDITION EVALUATION DEVICE AND EVALUATION METHOD

(75) Inventor: Kan Saito, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 205 days.

(21) Appl. No.: 13/133,960

(22) PCT Filed: Nov. 25, 2009

(86) PCT No.: PCT/IB2009/007552
§ 371 (c)(1),
(2), (4) Date: Jun. 10, 2011

(87) PCT Pub. No.: WO2010/067154
PCT Pub. Date: Jun. 17, 2010

(65) Prior Publication Data
US 2011/0241865 A1    Oct. 6, 2011

(30) Foreign Application Priority Data

Dec. 11, 2008 (JP) ................. 2008-316259

(51) Int. Cl.
*B60Q 1/00* (2006.01)
(52) U.S. Cl.
USPC ............. 340/439; 340/435; 340/436; 701/70; 701/110
(58) Field of Classification Search
USPC ............... 340/439, 435, 436; 123/492, 399, 123/349, 350, 493; 701/70, 110, 123
See application file for complete search history.

(56) References Cited

U.S. PATENT DOCUMENTS

| | | | |
|---|---|---|---|
| 8,026,801 B2 * | 9/2011 | Saito et al. ................ 340/441 |
| 8,037,870 B2 * | 10/2011 | Saito et al. ................ 123/492 |
| 2002/0123831 A1 | 9/2002 | Nakagawa et al. | |
| 2006/0109098 A1 | 5/2006 | Grill et al. | |
| 2007/0143002 A1 | 6/2007 | Crowell et al. | |
| 2007/0276582 A1 | 11/2007 | Coughlin | |
| 2009/0251304 A1 * | 10/2009 | Saito et al. ................ 340/441 |
| 2009/0288636 A1 * | 11/2009 | Saito et al. ................ 123/399 |
| 2010/0030458 A1 | 2/2010 | Coughlin | |

FOREIGN PATENT DOCUMENTS

| | | |
|---|---|---|
| DE | 102 35 165 | 2/2004 |
| JP | 2002 161772 | 6/2002 |
| JP | 2002-256919 A | 9/2002 |
| JP | 2003-235110 A | 8/2003 |

(Continued)

OTHER PUBLICATIONS

Japanese Office Action issued Sep. 11, 2012 in Patent Application No. 2008-316259 with English Translation.

(Continued)

*Primary Examiner* — Hoi Lau
(74) *Attorney, Agent, or Firm* — Oblon, Spivak, McClelland, Maier & Neustadt, L.L.P.

(57) ABSTRACT

A driving condition evaluation device is provided. The device includes a vehicle speed detection portion configured to detect a vehicle speed. A driving force estimation portion is configured to estimate driving force for driving a vehicle generated in accordance with a driving operation performed by a driver. A threshold value setting portion is configured to set a threshold value of the driving force based on the vehicle speed detected by the vehicle speed detection portion. A driving force information informing portion is configured to inform the driver of a relationship between the driving force estimated by the driving force estimation portion and the threshold value set by the threshold value setting portion.

10 Claims, 4 Drawing Sheets

(56) References Cited

FOREIGN PATENT DOCUMENTS

| | | |
|---|---|---|
| JP | 2003-278573 | 10/2003 |
| JP | 2006-44464 A | 2/2006 |
| JP | 2006-347214 | 12/2006 |
| JP | 2007 182196 | 7/2007 |
| JP | 2008 105559 | 5/2008 |
| JP | 2008-111402 A | 5/2008 |
| JP | 2008 162380 | 7/2008 |
| JP | 2008-174150 A | 7/2008 |
| JP | 2008 189149 | 8/2008 |
| JP | 2008 192069 | 8/2008 |
| JP | 2009 126246 | 6/2009 |
| WO | 2008 087541 | 7/2008 |

OTHER PUBLICATIONS

International Search Report issued Mar. 4, 2010 in PCT/IB09/07552 filed Nov. 25, 2009.

* cited by examiner

DRIVING CONDITION EVALUATION DEVICE AND EVALUATION METHOD

The invention relates to a driving condition evaluation device and evaluation method for evaluating a driving condition of a vehicle and, more particularly, to a driving condition evaluation device that achieves prevention of fuel consumption degradation by informing the driver of the vehicle of an evaluation of a driving condition.

Generally, although acceleration of vehicles driving on a public road is large during driving at low speed and is small during driving at high speed, acceleration necessary to realize normal driving falls within a certain range. Informing drivers that acceleration departing from such a certain range leads to fuel consumption degradation is desirable in view of an efficient use of energy and protection of global environment.

Under these circumstances, an accelerator opening display device for indicating an accelerator opening so as not to deviate from a fuel-efficient operation area is known (see, for example, Japanese Patent Application Publication No. 2008-105559).

The accelerator opening display device displays the difference (the amount of deviation) between a target accelerator opening set in accordance with a vehicle speed and an actual accelerator opening by considering transmission efficiency of a power train system (a clutch, a transmission, a propeller shaft, a differential gear, and a drive shaft) different for each vehicle model, and induces the driver so as to make fuel efficient accelerator opening.

Also known is an acceleration evaluation device that calculates an acceleration threshold value or a deceleration threshold value based on the total weight of a vehicle including the weights of an occupant, a mounted freight, and a mounted fuel weight at a time when abrupt acceleration or abrupt deceleration is performed, and informs the driver of the vehicle that, when acceleration and deceleration calculated based on a vehicle speed detected by a vehicle sensor becomes equal to or more than these threshold values, the acceleration (deceleration) is beyond the limit (see, for example, Japanese Patent Application Publication No. 2008-162380).

However, the accelerator opening display device described in Japanese Patent Application Publication No. 2008-105559 has a problem that, although each calculation is simple since accelerator opening is used as a criterion for determining the presence of fuel consumption degradation, vehicle characteristics (transmission efficiency of a power train system, acceleration characteristics, and a shift line different for each vehicle model, or a driving mode, a shift position, a vehicle speed, and the like) that affects the fuel consumption can not be reflected.

On the other hand, as in the acceleration evaluation device described in Japanese Patent Application Publication No. 2008-162380, in a case where an actual acceleration is used as a criterion for determining the presence of fuel consumption degradation, since the driver is informed that the acceleration is beyond the limit after the abrupt acceleration is actually performed, there is a problem that abrupt acceleration that brings about fuel degradation can not be sufficiently suppressed.

SUMMARY OF THE INVENTION

The invention provides a driving condition evaluation device capable of promoting suppression of fuel consumption degradation while evaluating a vehicle condition by using a further preferable criterion.

A driving condition evaluation device according to a first aspect of the invention includes: vehicle speed detection means configured to detect a vehicle speed; driving force estimation means configured to estimate driving force for driving a vehicle generated in accordance with a driving operation performed by a driver; threshold value setting means configured to set a threshold value of the driving force based on the vehicle speed detected by the vehicle speed detection means; and driving force information informing means configured to inform the driver of a relationship between the driving force estimated by the driving force estimation means and the threshold value set by the threshold value setting means.

In the driving condition evaluation device according the above aspect, the driving force estimation means may be adapted to estimate not-yet-generated driving force; and the driving force information informing means may be adapted to inform the driver of the relationship between the driving force estimated by the driving force estimation means and the threshold value set by the threshold value setting means before the driving force is actually generated.

The driving condition evaluation device according the above aspect may also include: driving force adequacy determination means configured to determine whether the driving force estimated by the driving force estimation means is equal to or more than the threshold value set by the threshold value setting means or not. The driving force information informing means may be adapted to inform the driver of the determination result when the driving force adequacy determination means determines that the driving force is equal to or more than the threshold value.

The driving force estimation means may be adapted to estimate driving force based on engine torque calculated by an engine controller based on an accelerator opening, and a transmission gear ratio and a torque converter ratio calculated by a transmission controller based on an accelerator opening.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, with reference to the drawings, an embodiment of the invention will be explained.

Figure 1:
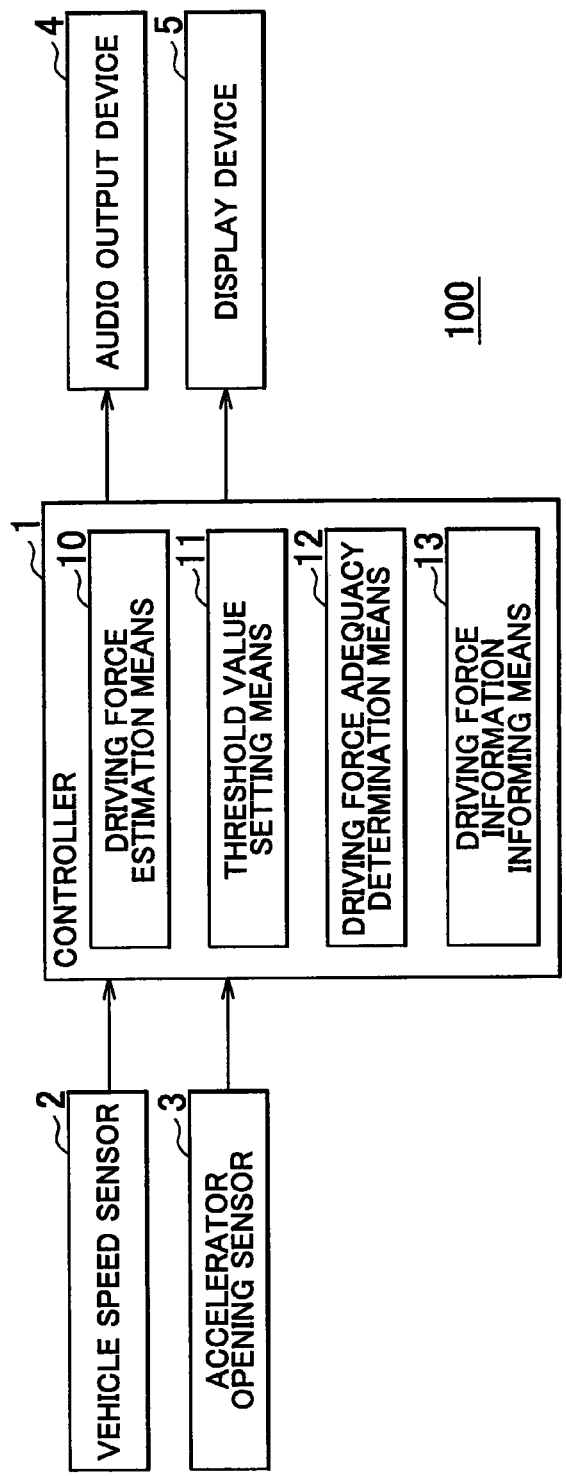
FIG. 1 is a block diagram (part 1) showing a configuration example of a driving condition evaluation device according to the invention.

FIG. 1 is a block diagram showing a configuration example of a driving condition evaluation device according to an embodiment of the invention. This driving condition evaluation device 100 is an in-vehicle device that achieves suppression of fuel consumption degradation by informing a driver of an evaluation of a driving condition performed by using driving force as a criterion. The driving condition evaluation device 100 includes a controller 1. The controller 1 receives an input from a vehicle speed sensor 2 and an accelerator opening sensor 3, and outputs a control signal to an audio output device 4 and a display device 5. These components are coupled via an in-vehicle LAN such as a controller area network (CAN), a local interconnect network (LIN), or the like.

The controller 1 is a computer provided with a central processing unit (CPU), a random access memory (RAM), a read only memory (ROM) and the like. For example, the controller 1 stores programs corresponding to driving force estimation means 10, threshold value setting means 11, driving force adequacy determination means 12, and driving force information informing means 13 in the ROM, and makes the CPU perform a process corresponding to each of the means.

The vehicle speed sensor 2 is a sensor for measuring a vehicle speed. For example, the vehicle speed sensor 2 is a magnetic resistance (MR) element being installed on each wheel, and reads a change of a magnetic field of a magnet that rotates together with the wheel as magnetic resistance. The vehicle speed sensor 2 detects a rotation speed of the wheel and a vehicle speed by extracting such a magnetic resistance as a pulse signal that is proportional to the rotation speed, and outputs the detected speed to the controller 1.

The accelerator opening sensor 3 is a sensor for measuring an accelerator opening. For example, the accelerator opening sensor 3 is a potentiometer for detecting the depressing amount of an accelerator pedal, and outputs the detected value to the controller 1.

The audio output device 4 is a device for audio-outputting various information. For example, the audio output device 4 is an in-vehicle speaker or buzzer, and outputs a warning sound or an audio guidance in accordance with the control signal output from the controller 1.

The display device 5 is a device for displaying various information. For example, the display device 5 is an indicator lamp, an in-vehicle display or the like that turns on or turns off the indicator lamp in accordance with the control signal output from the controller 1, and displays graphic data or text data.

Next, various means included in the controller 1 are explained.

The driving force estimation means 10 is means for estimating driving force (driving power) for driving a vehicle that is generated in accordance with a driving operation performed by the driver. For example, the driving force estimation means 10 estimates driving force corresponding to the depressing amount of an accelerator by the driver based on the output from the accelerator opening sensor 3.

Driving force is obtained by, for example, torque obtained from a transmission gear×a final gear ratio÷a tire radius. Also, the torque obtained from the transmission gear is obtained by, for example, engine torque×a transmission gear ratio×a torque converter ratio×power transmission efficiency.

The final gear ratio, the tire radius, and the power transmission efficiency are constant values set in advance for each vehicle model. The engine torque is a value that varies in accordance with an accelerator opening, the number of engine rotation, or the like. The transmission gear ratio and the torque converter ratio are values that vary in accordance with an accelerator opening, a shift position, or the like.

In general, the engine torque, the transmission gear ratio, and the torque converter ratio are values calculated by an engine ECU (not shown) in accordance with the output from the accelerator opening sensor 3 in order to control an engine and a transmission. The driving force estimation means 10 estimates driving force by performing, at the controller 1, a calculation similar to the calculation performed by the engine ECU to obtain the engine torque, the transmission gear ratio, and the torque converter ratio.

The driving force estimation means 10 may, after receiving from the engine ECU the values of the engine torque, the transmission gear ratio, and the torque converter ratio calculated in the engine ECU, perform a calculation for estimating driving force by using such values, and may also divert the driving force calculated in the engine ECU as is.

Also, the driving force estimation means 10 estimates, after the accelerator is depressed by the driver and before engine driving force is actually generated (before fuel is consumed), not-yet-generated engine driving force instantaneously. The reason is that the amount of fuel avoided from being consumed can be increased by the driver refraining from acceleration (to stop excessive depression of the accelerator more rapidly) by driving force information informing means 13 described later.

The threshold value setting means 11 sets a threshold value for determining whether the driving force estimated by the driving force estimation means 10 is adequate or not. For example, the threshold value is set based on an output from the vehicle speed sensor 2 every time the driving force estimation means 10 estimates the driving force.

This threshold value is a maximum acceptable value of the driving force assumed to be adequate and, for example, is a value obtained by multiplying the weight of the vehicle by a maximum acceptable value of acceleration that is assumed to be adequate at each vehicle speed level. A correspondence relationship between the vehicle speed and the maximum acceptable value of the acceleration or the driving force is determined in advance based on a driving environment (for example, the relationship is determined based on transportation conditions of the region where the vehicle is sold, and in such a region where short distance driving is repeated, the maximum acceptable value is set to a relatively low value. As a result, compared to other regions, the estimated driving force exceeds the threshold value with a relatively small depressing amount of the accelerator pedal), and is stored in the ROM and the like in the form of a look-up table. Moreover, the vehicle weight is a value set in advance for each vehicle model.

Figure 2:
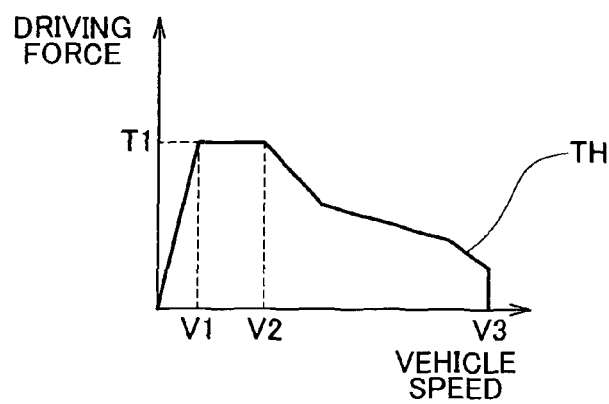
FIG. 2 is an example of a graph schematically showing contents of a look-up table.

FIG. 2 is an example of a graph schematically showing contents of a look-up table. The vertical axis shows the driving force, the lateral axis shows the vehicle speed, and the solid line TH shows a transition of the threshold value.

In the graph of FIG. 2, the threshold value increases up to a value T1 at a constant increasing rate while the vehicle speed rises from 0 (km/h) to V1 (km/h), and thereafter, maintains the value T1 until the vehicle speed becomes V2 (km/h), and then, gradually decreases in three stages of decreasing rates until the vehicle speed becomes V3 (km/h).

Thus, by using driving force as a criterion for determining the presence of fuel consumption degradation (or acceleration calculated by dividing driving force by the vehicle weight), the driving condition evaluation device 100 can share among a plurality of vehicle models the look-up table showing a correspondence relationship between a threshold value and a vehicle speed. This is because the driving force is a value already reflected with driving characteristics (transmission efficiency of a power train system, acceleration characteristics, and a shift line different for each vehicle model, or a driving mode, a shift position, a vehicle speed, and the like).

The driving force adequacy determination means 12 determines whether the driving force estimated by the driving force estimation means 10 is adequate or not, compares the driving force estimated by the driving force estimation means 10 with the threshold value set by the threshold value setting means 11, and determines that, when the estimated driving force becomes equal to or more than the threshold value, the driving force is excessive.

The driving force information informing means 13 is means for informing the driver of information relating to the driving force, and for example, outputs the magnitude relationship between the driving force estimated by the driving force estimation means 10 and the threshold value set by the threshold value setting means 11 by using the audio output device 4 and the display device 5.

Figure 3A:
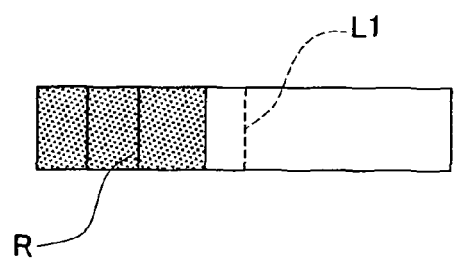
FIG. 3A and FIG. 3B are examples of images showing a magnitude relationship between estimated driving force and a threshold value.

FIG. 3 is an example of an image showing a magnitude relationship between estimated driving force and a threshold value. In FIG. 3A, the dashed line L1 shows a level of the threshold value, and the gray area R shows a relative size of the estimated driving force with respect to the threshold value. FIG. 3A shows that the estimated driving force at this moment is less than the threshold value and is at a level of about 80% of the threshold value.

Figure 3B:
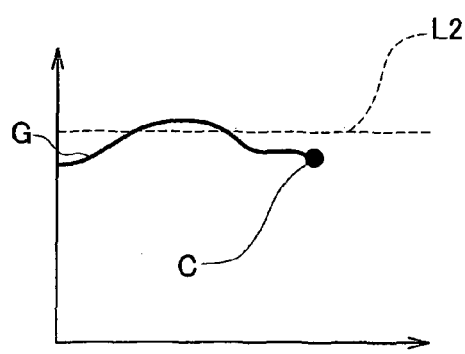

Also, in FIG. 3B, the vertical axis shows driving force, the lateral axis shows time, the dashed line L2 shows a level of a threshold value, the curved line G shows a transition of a relative size of the estimated driving force with respect to the threshold value, and the mark C shows a relative size of the estimated driving force with respect to the threshold value at this moment. FIG. 3B shows the state where the estimated driving force that was below the threshold value increased up to or exceeded the threshold value and again declined to below the threshold value.

The driving force information informing means 13 presents information using driving force as a criterion. Also, the driving force information informing means 13 may present information by using acceleration (a value obtained by dividing the driving force by the vehicle weight) as a criterion.

Also, the driving force information informing means 13 may intermittently output, when the estimated driving force becomes equal to or more than the threshold value, a short alert sound at a predetermined interval, and auditorily inform the driver of a magnitude relationship between the estimated driving force and the threshold value by shortening the interval as the difference between the estimated driving force and the threshold value becomes large.

Also, when the driving force adequacy determination means 12 determines that the estimated driving force is equal to or more than the threshold value and thus the driving force is excessive, the driving force information informing means 13 may make an eco lamp installed on an instrumental panel blink, or may turn on the eco lamp in the color of red. Moreover, the driving force information transmission means 13 may shorten the blinking interval as the difference between the estimated driving force and the threshold value becomes large to let the driver visually recognize without gazing at the eco lamp the magnitude relationship between the estimated driving force and the threshold value.

Also, the driving force information informing means 13 may, when the estimated driving force is less than the threshold value, turn off the eco lamp or turn on the eco lamp with the color of green. The eco lamp may be plurally structured with an eco lamp that indicates excessiveness of the driving force, and another eco lamp that indicates adequacy of the driving force.

Figure 4:
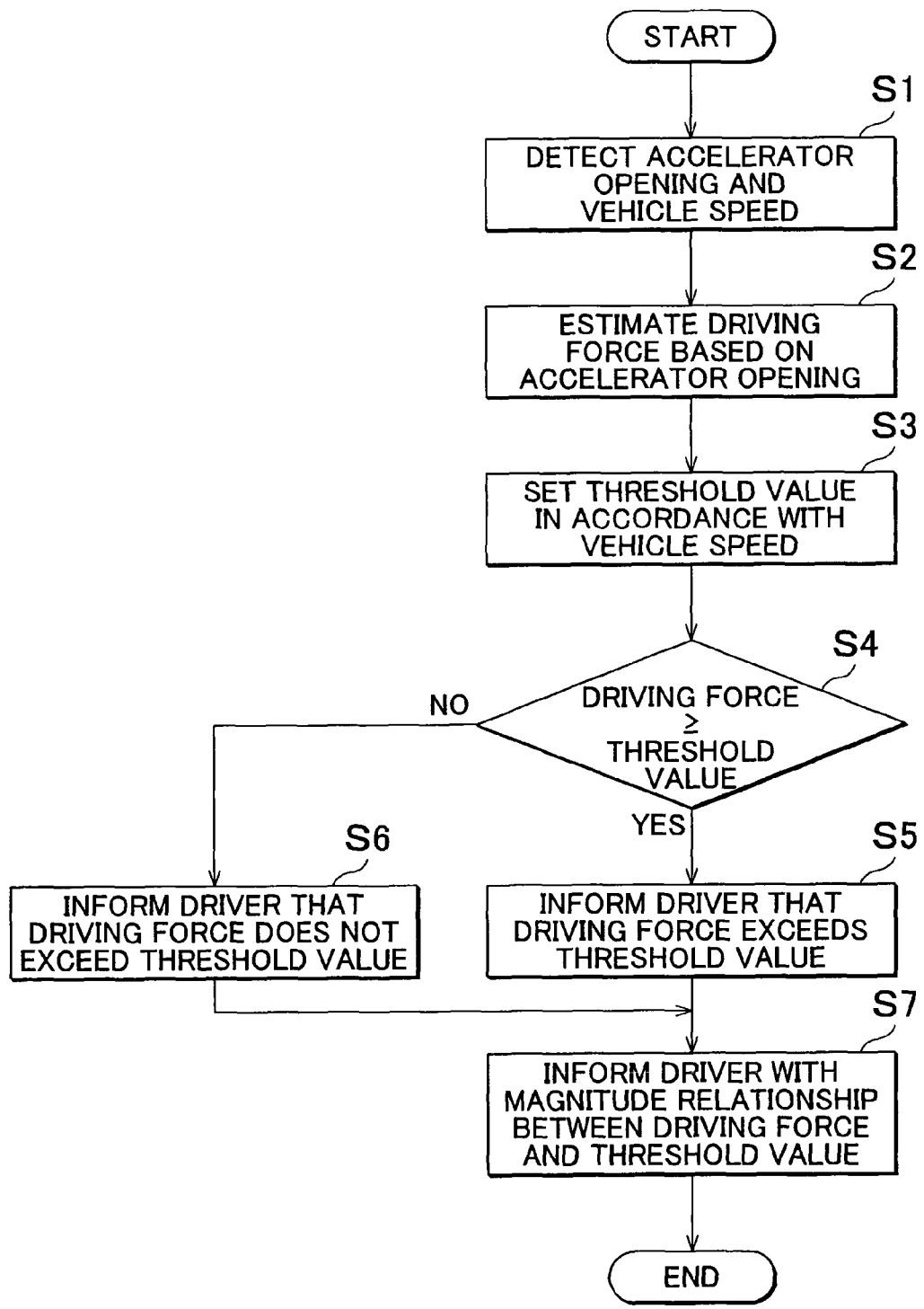
FIG. 4 is a flowchart showing a flow of an acceleration suppression process.

Next, with reference to FIG. 4, a process performed by the driving condition evaluation device 100 to suppress excessive acceleration by the driver by informing the driver of driving force information will be explained (hereinafter, an "acceleration suppressing process"). FIG. 4 is a flow chart showing a flow of the acceleration suppressing process. The driving condition evaluation device 100 performs such an acceleration suppressing process repeatedly in a predetermined cycle.

First, the controller 1 receives outputs from the vehicle speed sensor 2 and the accelerator opening sensor 3, and detects a vehicle speed and an accelerator opening of this moment (step S1).

Then, the controller 1 estimates, by the driving force estimation means 10, driving force that makes the vehicle advance forward based on the detected accelerator opening of this moment (step S2).

Also, the controller 1 extracts and sets, by the threshold value setting means 11, a threshold value used for comparing with the driving force estimated by the driving force estimation means 10 based on the detected vehicle speed at this moment and a look up table stored in the ROM (step S3).

The controller 1 may estimate the driving force by the driving force estimation means 10 after setting the threshold value by the threshold value setting means 11, or may execute the two processes concurrently.

Thereafter, the controller 1 compares, by the driving force adequacy determination means 12, the driving force estimated by the driving force estimation means 10 and the threshold value set by the threshold value setting means 11, and determines whether the estimated driving force is equal to or more than the threshold value or not (step S4).

If the estimated driving force is equal to or more than the set threshold value (YES in step S4), the controller 1 makes, by the driving force information informing means 13, the eco lamp installed on the instrumental panel blink or turn on in the color of red, and informs the driver that driving force to be generated in a moment exceeds the threshold value and will lead to fuel consumption degradation (step S5).

On the other hand, if the estimated driving force is less than the set threshold value (NO in step S4), the controller 1 makes, by the driving force information informing means 13, the eco lamp turn off if the eco lamp is turned on, or turn on in the color of green, and informs a driver that driving force to be generated in a moment is less than the threshold value and will not lead to fuel consumption degradation (step S6).

Thereafter, the controller 1 outputs, by the driving force adequacy determination means 12, the magnitude relationship between the estimated driving force and the set threshold value by using the audio output device 4 and the display device 5, regardless of the determination result of the driving force adequacy determination means 12 (step S7).

Thus, since the driver can always confirm the driving condition of his/her own vehicle by watching the image showing the magnitude relationship between the estimated driving force and the threshold value displayed on the in-vehicle display, and also can learn from the eco lamp the moment that the driving force is exceeding the threshold value. Thus, degradation of fuel consumption can be effectively suppressed.

With the above configuration, since the driving condition evaluation device 100 adopts the driving force reflected with the vehicle characteristics or the like different for each vehicle model as a criterion for determining the presence of fuel consumption degradation, the driver can be accurately informed of possible degradation of fuel consumption.

Also, since the driving condition evaluation device 100 adopts the driving force reflected with the vehicle characteristics or the like different for each vehicle model as a criterion for determining the presence of fuel consumption degradation, a look-up table (a table showing a correspondence relationship between the threshold value and the vehicle speed) can be commonly used beyond different vehicle models. Thus, the look-up table need not be prepared for each vehicle model as in the case where the accelerator opening is adopted as a criterion.

Also, the driving condition evaluation device 100 is different from a mode of informing the driver that the fuel consumption is degraded after abrupt acceleration is already performed as in the case of adopting the actual measurement value of acceleration as a criterion. The driving condition evaluation device 100 can inform the driver in advance that fuel consumption degradation may occur immediately before sudden acceleration occurs.

Figure 5:
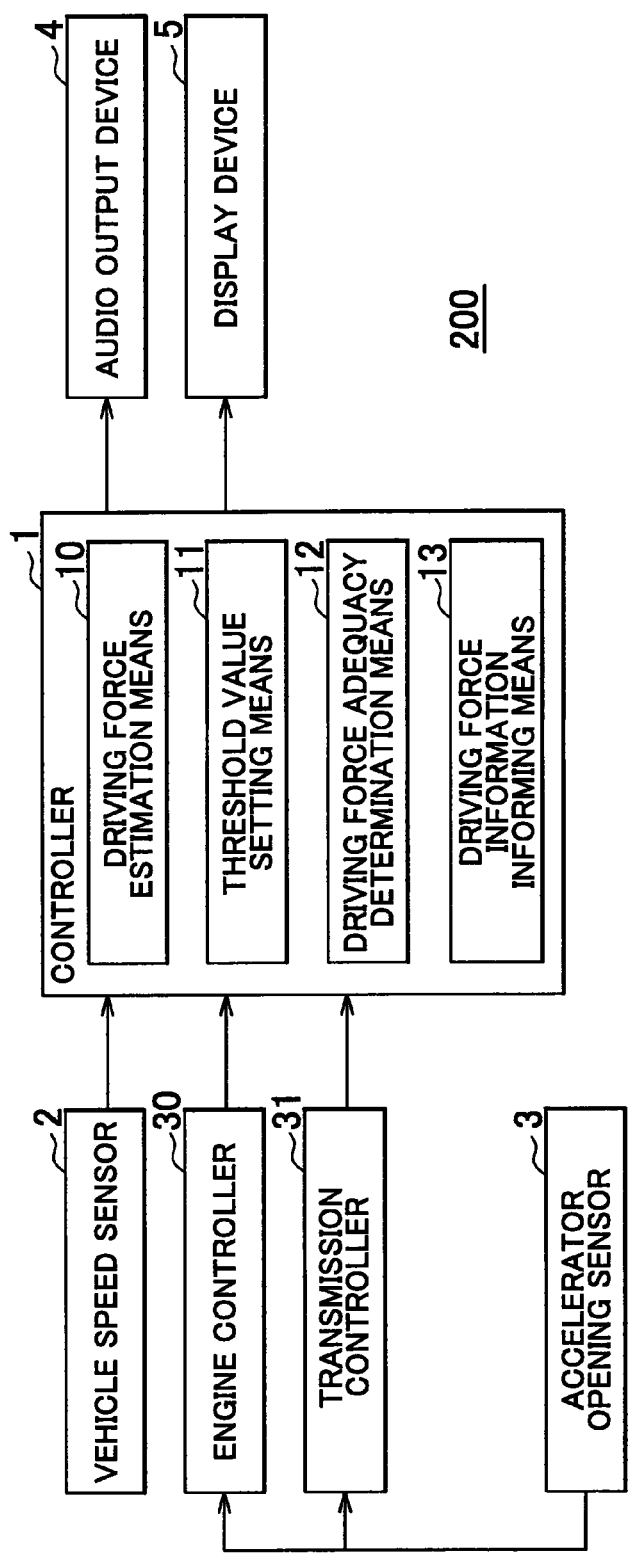
FIG. 5 is a block diagram (part 2) showing a configuration example of the driving condition evaluation device according to the invention.

Next, with reference to FIG. 5, another configuration example of a driving condition evaluation device according to the present invention will be explained.

A driving condition evaluation device 200 is common to the driving condition evaluation device 100 except in the point that, in the driving condition evaluation device 200, the driving force estimation means 10 estimates driving force based on a value of engine torque calculated by an engine controller 30 based on an accelerator opening and values of a transmission gear ratio and a torque converter ratio calculated by a transmission controller 31 based on an accelerator opening.

In the driving condition evaluation device 200, the driving force estimation means 10 estimates driving force by making the controller 1 to calculate values of engine torque, a transmission gear ratio, and a torque converter ratio based on accelerator opening obtained by the engine controller 30 and the transmission controller 31.

Both of the engine controller 30 and the transmission controller 31 are components mounted on the engine ECU, and may be either one of hardware or software, or a combination thereof.

Also, the engine controller 30 and the transmission controller 31 respectively include functions of engine controlling and transmission controlling. The engine controller 30 and the transmission controller 31 calculate engine torque, a transmission gear ratio, and a torque converter ratio to fulfill their own functions. Note that such values are not calculated only for driving force estimation.

With the above configuration, the driving condition evaluation device 200 exerts an effect of, in addition to the effects of the driving condition evaluation device 100, reducing a calculation load of the controller 1 by abbreviating a duplicated calculation processing by using as is the engine torque calculated by the engine controller 30 for controlling an engine, and the transmission gear ratio and the torque converter ratio calculated by the transmission controller 31 for controlling a transmission.

While the embodiment of the present invention is described in details above, the present invention is not limited to the above embodiment and, within the spirit and scope of the present invention, various modifications and alterations may be made to the above embodiment.

For example, in the above-described embodiment, the driving condition estimation devices 100, 200 are described as devices independent from the engine ECU. However, the devices 100, 200 may be integrated with the engine ECU to serve as a part of the engine ECU.

Also, the driving condition evaluation devices 100, 200 may calculate driving resistance (air resistance, rolling resistance, gradient resistance, and the like) of the vehicle by using outputs from various sensors such as a vane anemometer, an image sensor for detecting a condition of a road surface, and an inclination sensor for detecting a road gradient. The devices 100, 200 may correct values by increasing the threshold value set by the threshold value setting means 11 when the driving resistance is large, and by decreasing the threshold value set by the threshold value setting means 11 when the driving resistance is small.

An incremental correction of the threshold value is for preventing excessive alerting of the occurrence of fuel consumption degradation though the driver is performing acceleration in an adequate range according to the surrounding environment. A decrement correction is for promoting further improvement of fuel consumption according to the surrounding environment.

A driving condition evaluation device 100 includes: vehicle speed detection means 2 configured to detect a vehicle speed; driving force estimation means 10 configured to estimate driving force for driving a vehicle generated in accordance with a driving operation performed by a driver; threshold value setting means 11 configured to set a threshold value of the driving force based on the vehicle speed detected by the vehicle speed detection means 2; and driving force information informing means 13 configured to inform the driver of a relationship between the driving force estimated by the driving force estimation means 10 and the threshold value set by the threshold value setting means 11.

What is claimed is:

1. A driving condition evaluation device comprising:
   a vehicle speed detection portion configured to detect a vehicle speed;
   a driving force estimation portion configured to estimate a not-yet-generated driving force for driving a vehicle generated in accordance with an accelerator opening before a driving force is actually generated;
   a threshold value setting portion configured to set a threshold value of the not-yet-generated driving force based on the vehicle speed detected by the vehicle speed detection portion; and
   a driving force information informing portion configured to inform a driver before the driving force is actually generated of a relationship between the not-yet-generated driving force estimated by the driving force estimation portion and the threshold value set by the threshold value setting portion.

2. The driving condition evaluation device according to claim 1, further comprising:
   a driving force adequacy determination portion configured to determine whether the not-yet-generated driving force estimated by the driving force estimation portion is equal to or more than the threshold value setting portion or not;
   wherein the driving force information informing portion is adapted to inform the driver of the determination result when the driving force adequacy determination portion determines that the not-yet-generated driving force is equal to or more than the threshold value.

3. The driving condition evaluation device according to claim 1, wherein the threshold value is a maximum acceptable value of driving force assumed to be adequate among the detected vehicle speed.

4. The driving condition evaluation device according to claim 1, wherein the threshold value is a value obtained by multiplying the weight of the vehicle by a maximum acceptable value of acceleration assumed to be adequate among the detected vehicle speed.

5. The driving condition evaluation device according to claim 3, wherein a correspondence relationship between the vehicle speed, and the maximum acceptable value of the acceleration or the driving force is determined in advance based on a driving environment.

6. The driving condition evaluation device according to claim 1, further comprising a driving resistance detection portion configured to detect driving resistance of the vehicle; wherein the threshold value is corrected in accordance with the driving resistance.

7. The driving condition evaluation device according to claim 1, wherein the driving force estimation portion is adapted to estimate the not-yet-generated driving force based on engine torque calculated by an engine controller based on the accelerator opening, and a transmission gear ratio and a torque converter ratio calculated by a transmission controller based on the accelerator opening.

8. The driving condition evaluation device according to claim 1, further comprising an accelerator opening detection portion;
wherein the driving force estimation portion is adapted to calculate engine torque, a transmission gear ratio, and a torque converter ratio based on the accelerator opening detected by the accelerator opening detection portion, and is adapted to estimate the not-yet-generated driving force based on the calculation result.

9. A method for evaluating a driving condition of a vehicle, the method comprising:
detecting a vehicle speed;
estimating a not-yet-generated driving force for driving a vehicle in accordance with an accelerator opening before a driving force is actually generated;
setting a threshold value of the not-yet-generated driving force based on the detected vehicle speed; and
informing a driver before the driving force is actually generated of a relationship between the estimated not-yet-generated driving force and the set threshold value.

10. The method of claim 9, wherein the detecting includes detecting an accelerator opening and the relationship is determined by comparing the estimated not-yet-generated driving force with the set threshold value.

* * * * *